(12) United States Patent
Philipp et al.

(10) Patent No.: US 6,327,531 B1
(45) Date of Patent: Dec. 4, 2001

(54) METHOD OF AND DEVICE FOR DETERMINATION OF CHARACTERISTIC VALUES OF AN INTERNAL COMBUSTION ENGINE

(75) Inventors: Matthias Philipp, Vaihingen/enz; Christian Sobottka, Stuttgart, both of (DE); Henri Huynh, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/510,451

(22) Filed: Feb. 22, 2000

(30) Foreign Application Priority Data

Feb. 25, 1999 (DE) .............................. 199 08 077

(51) Int. Cl.$^7$ .................................... F02D 41/26
(52) U.S. Cl. ......................... 701/115; 123/339.2
(58) Field of Search ................ 123/339.2; 701/101, 701/102, 103, 104, 105, 106, 114, 115, 50

(56) References Cited

U.S. PATENT DOCUMENTS

| | | | |
|---|---|---|---|
| 5,269,271 | * 12/1993 | Kawai et al. | 123/339.2 |
| 5,651,341 | * 7/1997 | Harada et al. | 123/339.2 |
| 5,938,716 | * 8/1999 | Shutty et al. | 701/115 |
| 6,076,030 | * 6/2000 | Rowe | 701/50 |
| 6,076,037 | * 6/2000 | Ono et al. | 701/115 |

FOREIGN PATENT DOCUMENTS 197 45 682
A1  4/1999 (DE) .

* cited by examiner

Primary Examiner—Willis R. Wolfe
(74) Attorney, Agent, or Firm—Michael J. Striker

(57) ABSTRACT

In a method of and device for providing data of a model for determination of characteristic variables for controlling an internal combustion engine, in particular an internal combustion engine with direct injection or suction pipe injection, for each predetermined operation point of the internal combustion engine at least one local model in particular of low order is provided with data.

9 Claims, 3 Drawing Sheets

$$be = a_{11} * zw + a_{12} * zw^2 + a_{21} * wesb + a_{22} * wesb^2 + \ldots\ldots + a_{31} * zw * wesb + ..$$
$$ehc = b_{11} * zw + b_{12} * zw^2 + b_{21} * wesb + b_{22} * wesb^2 + \ldots\ldots + b_{31} * zw * wesb + ..$$
$$eno = c_{11} * zw + c_{12} * zw^2 + c_{21} * wesb + c_{22} * wesb^2 + \ldots\ldots + c_{31} * zw * wesb + ..$$

METHOD OF AND DEVICE FOR DETERMINATION OF CHARACTERISTIC VALUES OF AN INTERNAL COMBUSTION ENGINE

BACKGROUND OF THE INVENTION

The present invention relates to a method of and a device for data determination of a model for determination of characteristic variables of an internal combustion engine, in particular an internal combustion engine with direct injection or suction pipe injection.

The non published patent application DE 197 45 682 discloses a method of and a device for determination of characteristic variables, which are a part of a model for controlling a drive unit, and depending on the type of the drive unit, can be different. There first, by automatic processing of a predetermined measuring program, measuring data are determined for at least one operational variable of the drive unit for different operation points of the drive unit. Then, in a second step the characteristic variables are measured by optimization of the deviation, and the operational variable is determined on the basis of the calculated value of the characteristic variables.

SUMMARY OF THE INVENTION

Accordingly, it is an object of present invention to provide a method of the above mentioned general type which is improved in that, with lowest possible measuring expenses, a model of an internal combustion engine can be exactly provided with data, for obtaining optimal characteristic variables for controlling an internal combustion engine.

In keeping with these objects and with others which will become apparent hereinafter, one feature of present invention resides, briefly stated, in a method of data determination of a model for determination of characteristic variables for controlling an internal combustion engine in which for each predetermined operation point of the internal combustion engine, at least one local model, in particular of low order, is provided with data.

An especially great advantage of the present invention is that the data determination of a local model of an internal combustion engine is possible with a minimum expense for the measurements. This stands in contrast to the expensive screen measurement.

The data determination of a model means in this connection that the model coefficients or model parameters are determined so that the deviation between the real internal combustion engine and the model of the internal combustion engine is minimal. A local model means that the model is provided with data only for a predetermined operation point of the internal combustion engine and only for this predetermined operation point of the internal combustion it is valid.

For example, for data determination of a model of an internal combustion engine by means of a screening process, when only one operational variable and three actuation variable of the internal combustion engine are considered and when the actuation variable are varied only in three steps, $3^3=27$ measurements are needed. With a local model of second order, to the contrary, only 10 measurements are needed in order to completely determine or provide the model with data.

With increased number of actuation variable and operational variables, the advantage of a local modeling is more pronounced. When for example five actuation variable and one operational variable of the internal combustion engine are considered in a model and when the five actuation variable for providing data of the model are changed in five steps, then $5^5=3125$ measurements must be performed. In contrast, for example with a local model of second order with alternating action of a first order, only 26 measurements are needed to provide data or to determine the model. In order to prevent a model error or to compensate the measuring error better, in practice more than 26 measurements are performed.

A further advantage of the present invention is that with the use of local models of low order, a simple and clear mathematical model of the internal combustion engine is provided.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

The present invention is illustrated for example as an internal combustion engine with direct injection. However, the invention can be used for controlling any electromechanical system, in particular a motor vehicle, which is provided with a control device.

Figure 1:
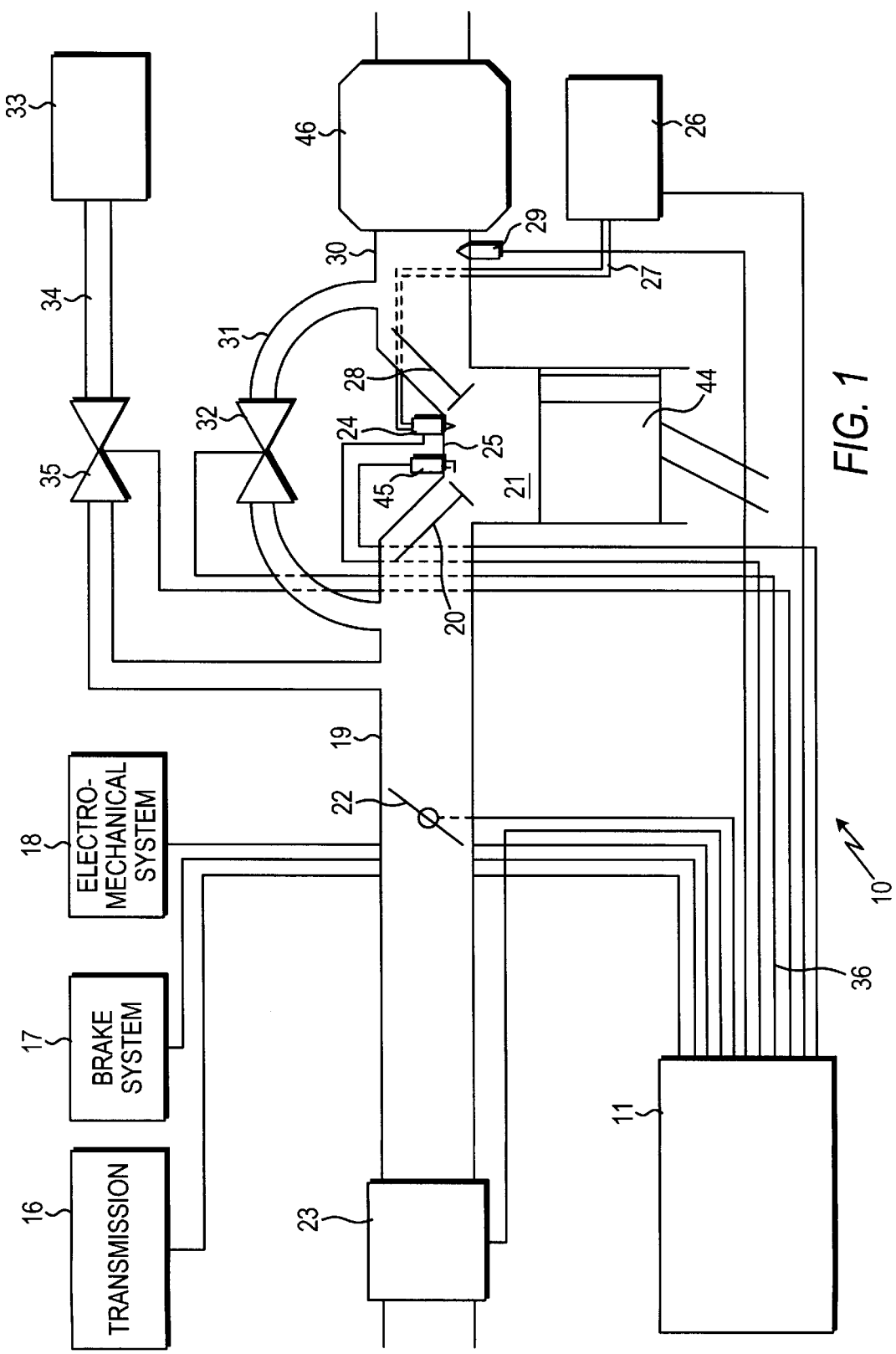
FIG. 1 is a view schematically showing an internal combustion engine with a control device.

As shown in FIG. 1, in an internal combustion engine with direct injection 10 fresh air is supplied by means of a suction pipe 19 through an inlet valve 20 to a combustion chamber 21. The quantity of the fresh air supply into the combustion chamber 21 can be controlled by a throttle flap 22. An air quantity measuring device 23 determines the fresh air flowing into the internal combustion engine.

An injection valve 24 and a spark plug 45 are arranged in a cylinder head 25. A high pressure pump 26 supplies the fuel at a working pressure and injects it through a fuel supply conduit 27 and an injection valve 24 into the combustion chamber 21.

The injected fuel is ignited by means of the spark plug 45. A piston 44 is driven by expansion of the ignited fuel. Furthermore, the combustion chamber 21 has an outlet valve 28 for ejection of exhaust gas produced during combustion.

A lambda probe 29 is arranged in an exhaust gas pipe 30. By means of the lambda probe 29, in the exhaust gas pipe 30 the oxygen fraction in exhaust gas can be measured. Thereby the air-fuel ratio in the mixture can be determined. A catalyst 46 is further arranged in the exhaust gas pipe 30. The catalyst 46 operates for converting damaging exhaust gas components such as CO HC and NO into $CO_2$, $H_2O$ and $N_2$.

An AGR conduit 31 connects the exhaust pipe 30 with the suction pipe 19. Thereby, due to the higher pressure in the exhaust pipe 30 exhaust gasses are supplied from the exhaust pipe 30 into the suction pipe 19. By means of the AGR valve 32, the exhaust gas stream in the AGR conduit 31 can be controlled.

A tank ventilating conduit 34 leads from a fuel tank or and activated carbon container 33 to the suction pipe 19. Thereby additional oxygen can be supplied into the suction pipe 19 and therefore into the combustion chamber 21. The fuel flow in the tank ventilation conduit 34 can be controlled by a tank ventilation valve 35.

The control of the total internal combustion engine 10 is performed by a control device 11. Furthermore, the control device 11 can control a transmission 16, a brake system 17 and any further electromechanical systems 18. Various sensors and actuators are controlled by the control device 11 through signal and control conductors 36.

The internal combustion engine 10 can operate in different operation modes, which substantially differ by the injection time, the ignition time and the cylinder filling. The control device 11 can convert the internal combustion engine 10 from one operational mode to another. The important operational mode of the internal combustion engine are the homogenous operation "hom" and the shift operation "sch".

In the homogenous operation "hom", the fuel is injected by the injection valve 24 into the combustion chamber 21 during a suction phase which is caused by the piston movement. Simultaneously air is aspirated via the throttle flap 22. The aspirated air whirls the fuel, which thereby is distributed in the combustion chamber approximately uniformly or homogeneously. The fuel-air mixture is subsequently compressed, for igniting by a spark plug 45. The ignited fuel-air mixture extends and drives the piston 44. The produced torque depends in the homogenous operation substantially on the position of the throttle flap 22 and therefore is substantially proportional to the fresh gas filling in the cylinders. In order to obtain a high torque and a low pollutant generation during the combustion, the air-fuel mixture is adjusted as close as possible to lambda=1 or lambda <1. The homogenous operation is set in full load operation of the internal combustion engine.

In the shift operation "sch" the throttle flap 22 is widely opened, and thereby the internal combustion engine operates approximately unthrottled. The fuel is injected during the compression phase so that at the time of ignition an ignitable air-fuel cloud is located in the immediate surrounding area of the spark plug. Then the air-fuel cloud is ignited by the spark plug 45, and the piston 44 is driven by the following expansion of the ignited air-fuel cloud. The thusly produced torque depends in the shift operation substantially on the injected fuel mass rk. The shift operation is set in a partial load region of the internal combustion engine.

In order to obtain an optimal torque and a low pollutant generation during combustion, in the shift operation several actuation variable more than in homogenous operation must be considered. In the homogenous operation as a rule only the ignition angle zw and the standardized air-fuel ratio lambda are considered as dominant actuation variables. In contrast, in the shift operation as a rule the ignition angle zv, the standardized air-fuel ratio lambda, the angle of the injection start wesb, the ratio of suction pipe pressure to environment pressure ps/pu, the exhaust gas return rate agr, the fuel pressure prail, the position of the charge movement flap lb and the valve overlapping vvc are considered as dominant actuation variables.

With the selection of the dominant operational variables of the internal combustion engine with direct injection, the relationships are similar. In homogenous operation as a rule only the specific fuel consumption be, the knocking kl and the exhaust gas temperature tab are considered as operational variables. In the shift region as a rule after seven operational variables are considered. They include the specific fuel consumption be, the knocking kl, the exhaust gas temperature tab, the running unquietness LU, the hydrocarbon emission EHC, the nitrogen emission $ENO_S$, the soot fraction in exhaust gas SZB and the average combustion pressure pmi.

Due to the plurality of dominant acting and operational variables, approximately by the factor $10^3$ more measurements in the shift operation than in the homogenous operation of the internal combustion engine are needed, for providing data for a model of the shift operation by means of the screen process.

Figures 2A, 2B:
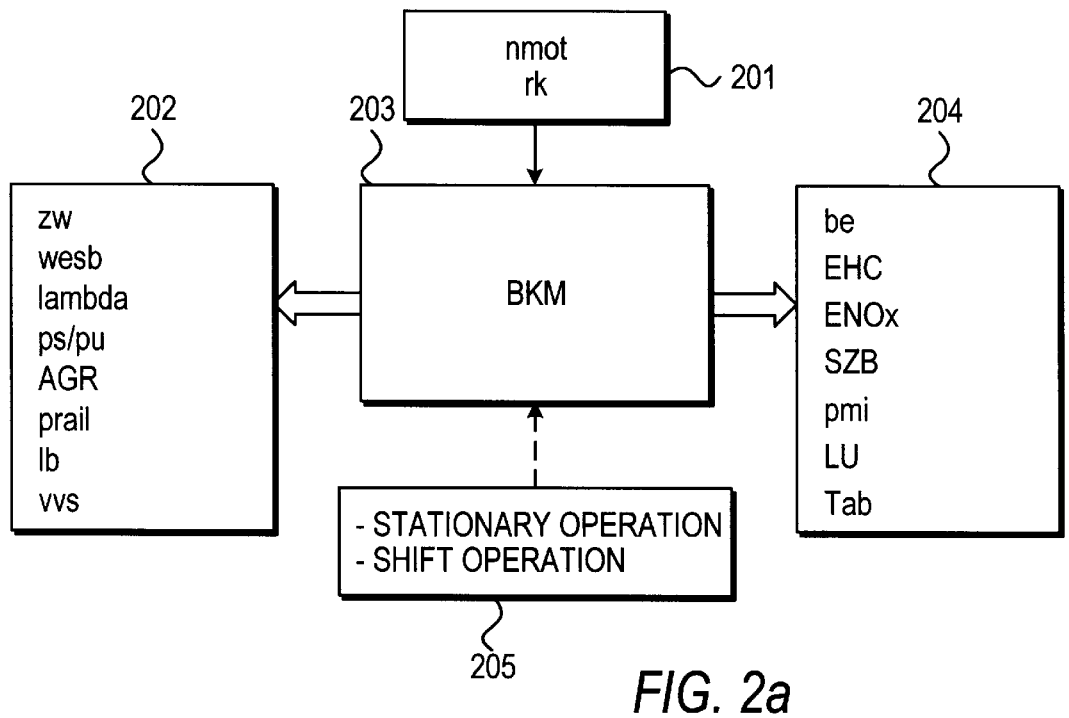
FIG. 2a is a view schematically showing an internal combustion engine with actuation variables and operational variables for a shift operation.
FIG. 2b is a view showing a selected model set up of a polynom of second order with alternating action of first order.

FIG. 2a schematically shows an internal combustion engine with a direct injection, wherein in particular variables which are relevant for the shift operation are illustrated. In a block 201, the variables are shown which characterize an operation point of the internal combustion 10 in a shift operation.

Operation point variables:
nmot: Rotary speed
rk: Relative fuel mass

In a block 202 the actuation variables of the internal combustion engine in shift operation are shown.

Actuation variables:
zw: Ignition angle
wesb: Angle of injection start
ps/pu: Ratio of suction pipe pressure to surrounding pressure
agr: Exhaust gas return rate
prail: Fuel pressure
lb: Position of the charge movement flap
vvs: Valve overlapping.
lambda Standardized air-fuel ratio.

In block 203 schematically the internal combustion engine is illustrated. In block 204 the operational variables of the internal combustion engine is visible region are shown.

Operational variables:
be: Fuel consumption, which in fifth operation is proportional to output moment Md.
EHC: Hydrocarbon emission.
$ENO_x$ Nitrogen emission.
SZB: Soot fraction in exhaust gas (soot number).
pmi: Average combustion pressure.
LU: Running unquiteness.
tab: Exhaust gas temperature.

In block 205 edge conditions are illustrated, which are required for providing data of the model. For example, they are a stationary operation of the internal combustion engine, a shift operation as an adjusted operational mode, and an evaluation of the raw exhaust gas emission.

An example for a model setup is illustrated in FIG. 2a. With it the relationship between the operational variables of the internal combustion engine and the actuation variable in a shift operation can be determined. This model is assembled for each operation point of the internal combustion engine for the shift operation. An operation point in the shift operation is formed from a rotary speed not and a relative fuel mass rk, wherein the fuel mass is proportional to the output moment.

The values which are representative of the operation point of the internal combustion engine are substantially dependent on the adjusted operational mode. For example, in the homogenous operation an operation point is formed of a rotary speed nmot and the cylinder filling rl, wherein here the cylinder filling is substantially proportional to the output moment.

For providing data of this model, or in other words for determination of the relationship between the actuation variables and the operational variables, the coefficients $a_{xx}$ $b_{xx}$ and $c_{xx}$ of the corresponding terms must be determined.

The first equation determines the relationship between the fuel consumption be and the actuation variable of the internal combustion engine dar, wherein for the sake of the space, not all terms are determined. The second equation determines the relationship between the hydrocarbon emission EHC and the actuation variables of the internal combustion engine dar. The third equation determines the relationship between the nitrogen emission $ENO_X$ and the actuation variables of the internal combustion engine. Further equations of the model are not illustrated for the space reasons.

Figure 3:
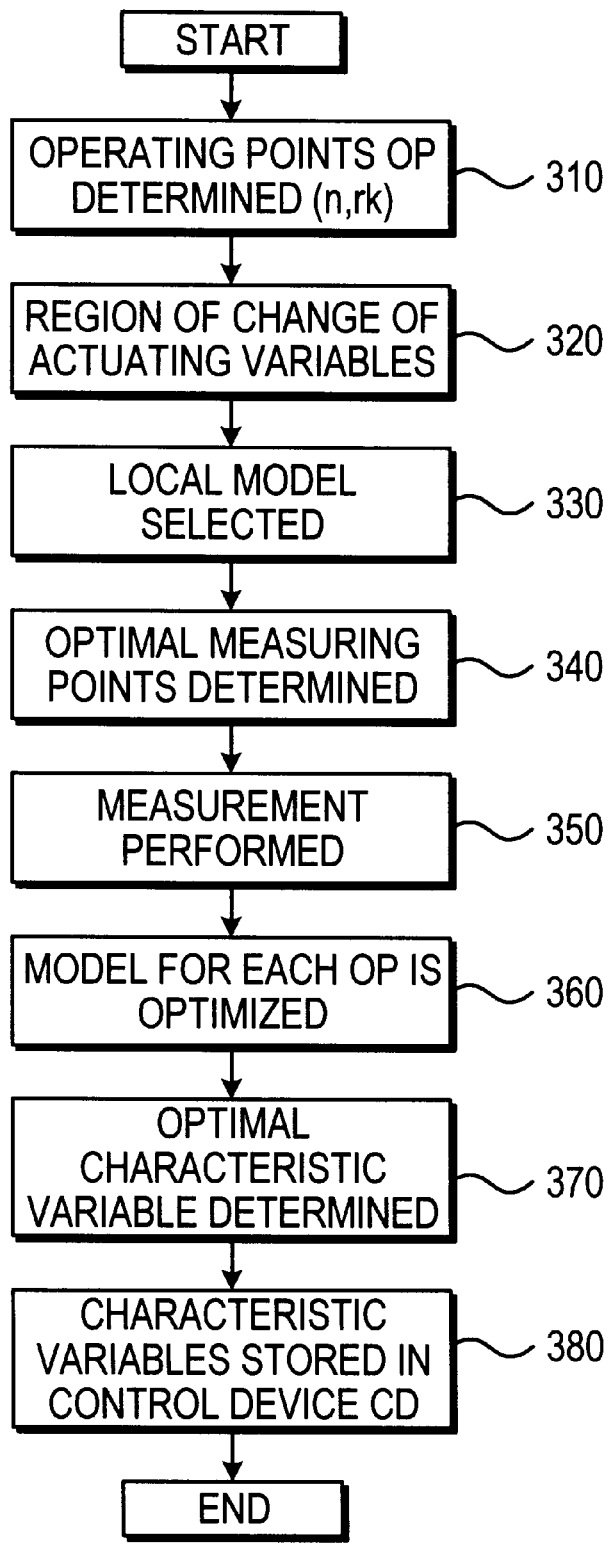
FIG. 3 is a view show schematically showing a process course of the inventive method.

The selected model setup is here shown only exemplary and can be expanded to any number of operating variables and actuating variables. FIG. 3 shows a flow chart of the individual steps of the inventive method. After a start of the method, first in step 310 operating points of the internal combustion engine are determined, for which individually a local model must be provided with data. In the shift operation this operation points are formed by the rotary speed nmot and the injected fuel mass rk. The operation points are determined within the maximum permissible rotary speed and the maximum possible injecting fuel mass for the shift operation of the internal combustion engine.

In step 320 a region of the change of the actuating variables is determined, in which a permissible operation of the internal combustion engine in the shift operation is guaranteed. For this purpose for example two actuating variables of the internal combustion engine are varied, while the other actuating variables are maintained constant. Simultaneously the running unquiteness LU and/or the average combustion pressure PMI are measured. By evaluation of these measured variables, for example by comparison with a threshold value the permissible change region of the actuating variable can be determined.

In step 330 the order of the local model for describing the shift operation of the internal combustion engine is selected. The order of the model can be predetermined or can be arbitrarily selectable. Measurements have shown that a model of second order with alternating actions of first order sufficiently accurately describe the shift operation of an internal combustion engine with direct inject, and maintain the measuring expenses for providing data of the model in justifiable limits.

In step 340 the optimal measuring points are determined, which are required for providing data of the model and completely determine this model. The number of the measurements is determined in dependence on the model order, on permissible region of the changes of the actuating variables of the internal combustion engine, and on the desired model accuracy. For example for this purpose a method for research planning, for example "Design of Experiments" (DOE) can be used.

In a step 350 automatically each predetermined operation point of the internal combustion engine is set, and measurements required for providing data of the local model are performed.

In a step 360, the model of the shaft operation of the internal combustion engine for each operating point is optimized. For this purpose the coefficients of the set local model for each operation point are changed so that the distance between the operating variables calculated by the model and the operating variables determined by the measurement is minimal. For example as a measure for the distance, an average square distance or an amount of an average distance are selected.

In step 370, the optimal characteristic variables for an operation of the internal combustion engine are determined.

In step 380 the determined optimal characteristic variables are stored in the control device.

For the sake of completeness it should be mentioned that both with the predetermined actuating variables and also the operating variables, depending on model, motor, vehicle, etc., not all of them must be used.

It will be understood that each of the elements described above, or two or more together, may also find a useful application in other types of methods and constructions differing from the types described above.

While the invention has been illustrated and described as embodied in method of and device for determination of characteristic values of an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A control device for operation of an internal combustion engine, comprising a memory formed as a read-only-memory; a computing device formed as a microprocessor, said memory being formed so as to store a program which is outputtable to said computing device and suitable for performing a method including the steps of providing data of at least one local model of low order for each predetermined operation point of an internal combustion engine.

2. A method for providing data of a model for determining characteristic variables for controlling an internal combustion engine, the method comprising the steps of providing data of at least one local model of low order for each predetermined operation point of an internal combustion engine, said providing includes forming the local model of a polynom of a second order with alternating actions of a first order.

3. A method for providing data of a model for determining characteristic variables for controlling an internal combustion engine, the method comprising the steps of providing data of at least one local model of low order for each predetermined operation point of an internal combustion engine, said providing includes providing the at least one local model of the internal combustion engine which has a direct injection; selecting variables which are representative of an operation point as a rotary speed MNOT and a fuel mass signal RK or a rotary speed and MOT and a fresh gas cylinder filling RL; selecting actuating values as at least two values of the following values: lambda LAM, ignition angle ZV, angle of injections of an injection start WESB, suction pipe pressure PS, a ratio of suction pipe pressure to surrounding pressure PS/PU, a rate of an exhaust gas return AGR, a fuel pressure DRAIL, valve overlapping VVS, position of a charge movement flap LB; selecting as operational variable at least one variable of the following: fuel consumption BE, moment M, average combustion pressure PMI, hydrocarbon emission EHC, nitrogen emission $ENO_x$, knock signal KI, running unquiteness value LU, exhaust gas temperature tab, soot fraction in exhaust gas SZB.

4. A method as defined in claim 3; and further comprising selecting as the actuating variables at least the following variables: lambda LAM, ignition angle ZW, angle of an injection start WESB, suction pipe pressure PS, a ratio of suction pipe pressure to surrounding pressure PS/PU, rate of exhaust gas return AGR, fuel pressure PRAIL, valve overlapping VVS, position of a charge movement flap LP.

5. A method for providing data of a model for determining characteristic variables for controlling an internal combustion engine, the method comprising the steps of providing data of at least one local model of low order for each predetermined operation point of an internal combustion engine.

6. A method as defined in claim 5, wherein said providing includes providing the model as a model for selected operation variables of the internal combustion engine, with which on a basis of variables which are represented of the operation points and of actuating variables of the internal combustion engine, operation variables of the internal combustion engine are determined.

7. A method as defined in claim 5, and further comprising the step of determining an optimal number of measuring points for providing date of the local model by means of statistic expressions via dissipation of measuring values, for determining the model and minimizing a model error E.

8. A method as defined in claim 5, and further comprising determining coefficients of the model by multiple regressions by minimizing a model error E.

9. A method as defined in claim 5, and further comprising completing the model for controlling an element selected from the group consisting of a transmission, a brake device, and a further electromechanical system.

\* \* \* \* \*